Figure 1:
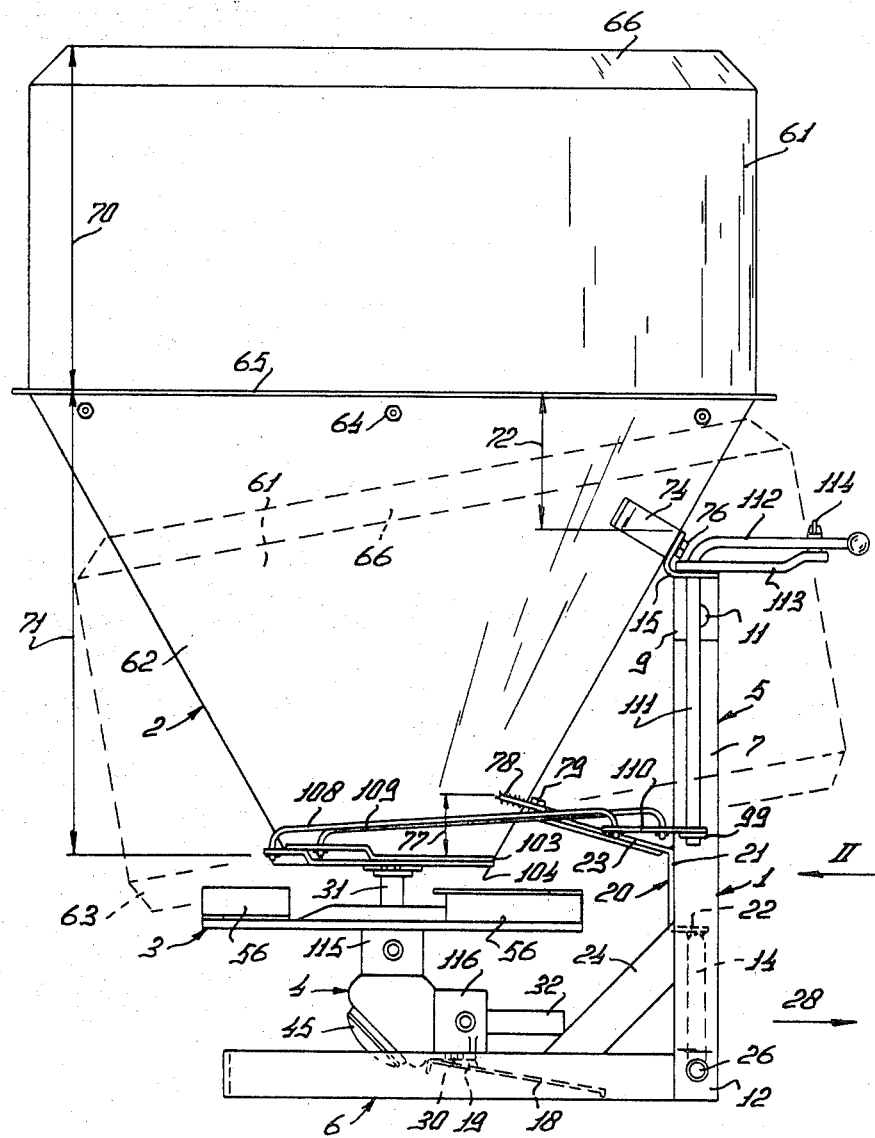

United States Patent [19]

van der Lely

[11] 3,767,126
[45] Oct. 23, 1973

[54] SPREADING IMPLEMENTS
[76] Inventor: Cornelis van der Lely, 7, Brüschenrain, Zug, Switzerland
[22] Filed: Feb. 8, 1972
[21] Appl. No.: 224,543

[30] Foreign Application Priority Data
Feb. 8, 1971 Netherlands.................. 7101612

[52] U.S. Cl.............. 239/661, 239/670, 239/683, 239/684
[51] Int. Cl............................................. A01c 3/06
[58] Field of Search........................ 74/606, 417; 239/661, 670, 683, 684, 687

[56] References Cited
UNITED STATES PATENTS
| | | | |
|---|---|---|---|
| 3,615,055 | 10/1971 | Van Der Lely et al......... | 239/687 X |
| 2,882,737 | 4/1959 | Fromm........................... | 74/606 X |
| 3,539,113 | 11/1970 | Tyler.............................. | 239/684 X |
| 2,632,651 | 3/1953 | Rittenhouse.................... | 239/661 |
| 3,279,801 | 10/1966 | Meyer............................ | 239/687 |
| 2,011,355 | 8/1935 | Devener et al. ................ | 74/606 X |
| 2,901,257 | 8/1959 | Teagle............................ | 239/661 |
| 3,129,846 | 4/1964 | Lely et al....................... | 239/670 |

Primary Examiner—M. Henson Wood, Jr.
Assistant Examiner—John J. Love
Attorney—Mason, Mason & Albright

[57] ABSTRACT

A spreading implement has a container of two separable parts mounted on the upper vertical portion of a frame and a rotatable spreader with a transmission gear box supported on the lower horizontal frame portion. The gear box includes a cast housing with input and output shafts extending at angles to one another for connection to a prime mover's power take off and the spreader respectively. The output shaft extends upwardly through a relatively large opening in the container where it is detachably secured to an agitator. The angle between the shafts is less than 180° and the housing has an access opening opposite the shafts for access to pinions releasably mounted on the shafts and removable bearings in the housing. The container has an opening in its bottom which can be more or less exposed to allow material to fall on an inwardly inclined face of the spreader. The agitator has an upper detachable part fitted on a lower part. Most of the parts of the implement can be detached and easily replaced.

21 Claims, 5 Drawing Figures

SPREADING IMPLEMENTS

An object of the invention is the provision of an effective but inexpensive implement of this kind.

According to one aspect of the invention, there is provided an implement of the kind set forth, wherein said gear box or housing is afforded wholly or principally by a single unit in which two shafts are mounted having a maximum angle of less than 180° enclosed between their longitudinal axes, the single unit being formed with an access opening, provided with a closing member, at the side thereof opposite to the side at which said angle is located.

Figure 2:
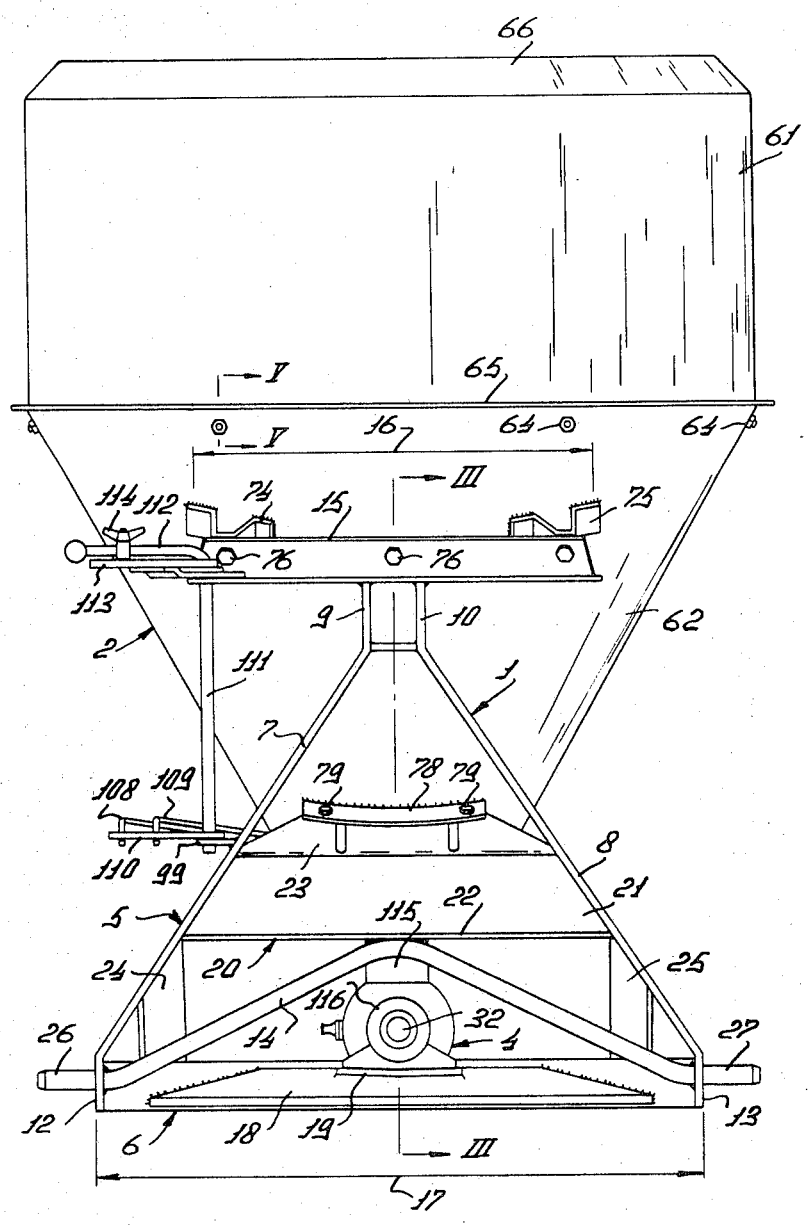
Figure 3:
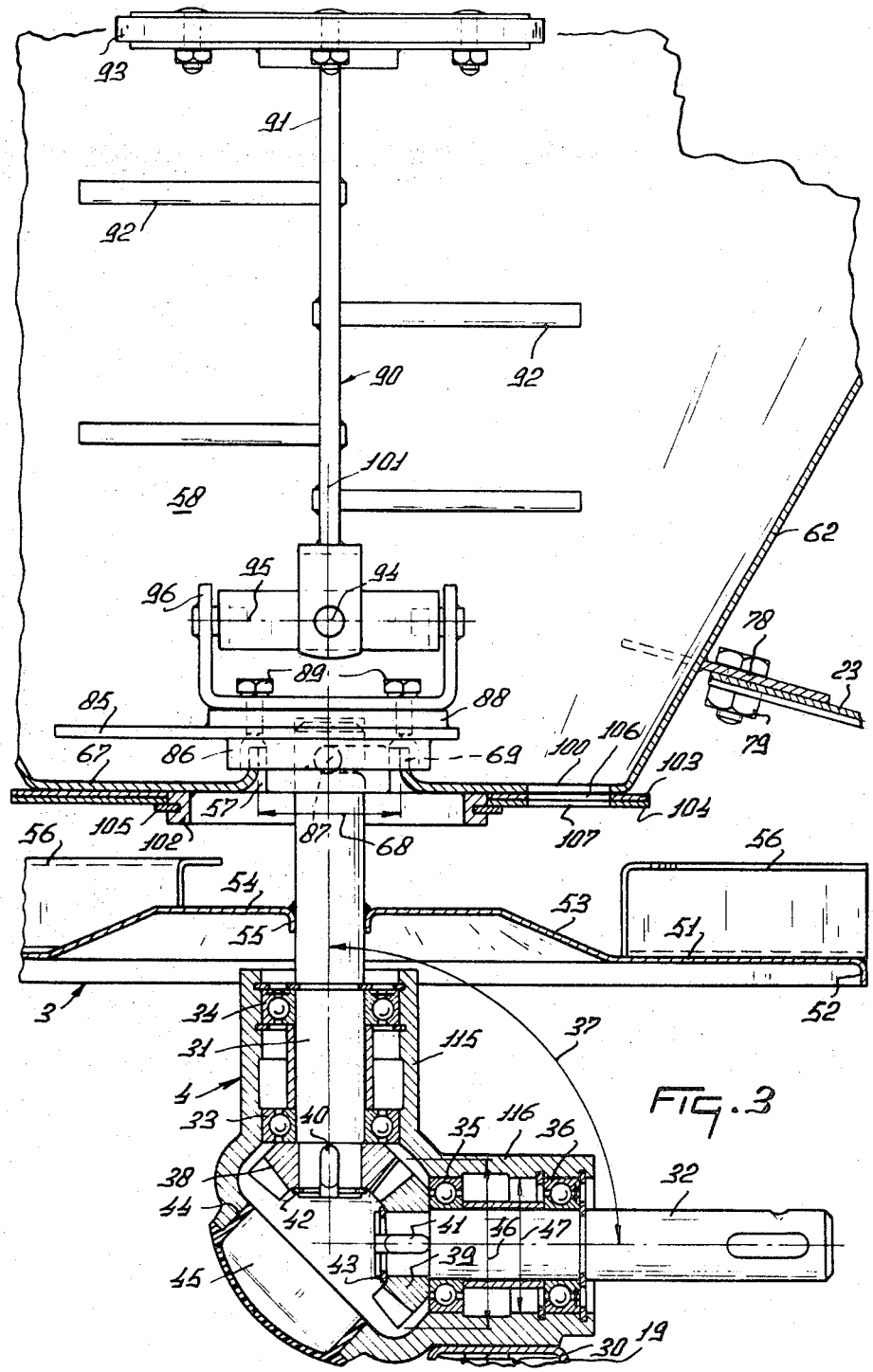
Figure 4:
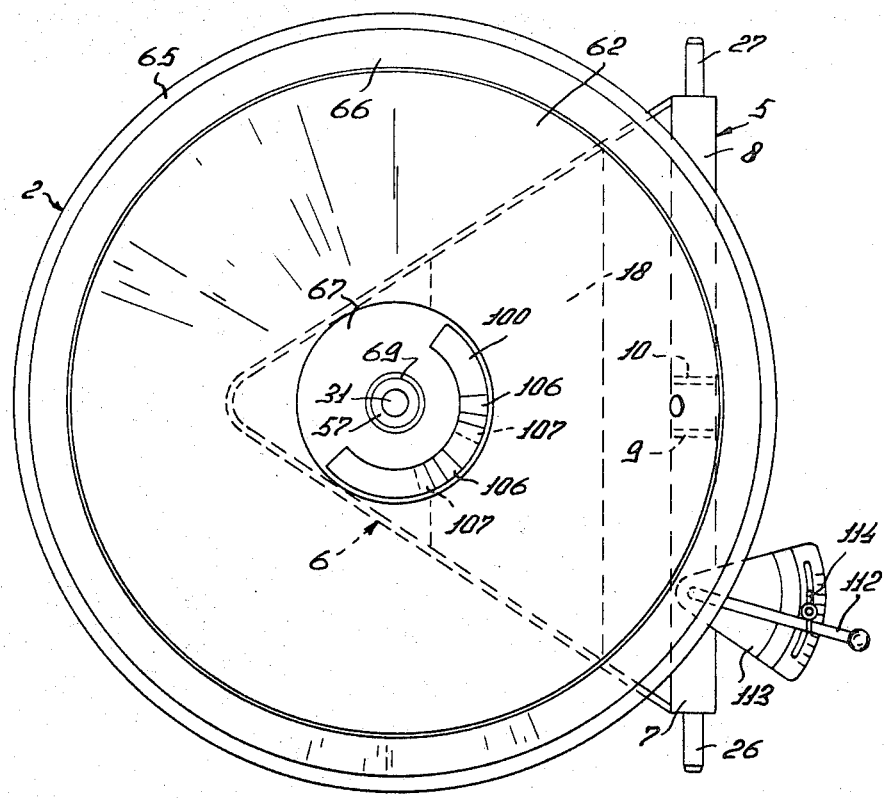
Figure 5:
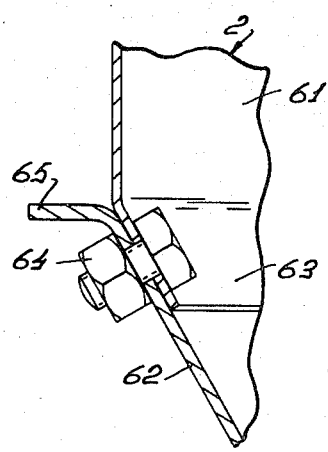

For a better understanding of the invention, and to show how the same may be carried into effect, reference will now be made, by way of example, to the accompanying drawings, in which:

FIG. 1 is a side elevation of a spreading implement in accordance with the invention, FIG. 2 is a front elevation of the implement of FIG. 1 as seen in the direction indicated by an arrow II in the former Figure, FIG. 3 is a section, to an enlarged scale, taken on the line III—III of FIG. 2, FIG. 4 is a plan view corresponding to FIGS. 1 and 2, and FIG. 5 is a section, to an enlarged scale, taken on the line V—V of FIG. 2.

Referring to the drawings, the spreading implement which is illustrated has a frame 1 which carries a container for the material to be spread in the form of a hopper 2. A rotary spreading member 3 is fastened to a substantially vertical shaft 31 whose lower end is rotatably journalled in a gear box or housing 4 that is rigidly connected to the frame 1, the rotary spreading member 3 being located immediately beneath a delivery or outlet portion of the hopper 2 which latter has a lower portion of inverted frusto-conical configuration.

The frame 1 comprises a substantially vertical portion 5 whose lower extremity is fastened to a substantially horizontal portion 6. The substantially vertical portion 5 includes two upwardly converging strip-shaped beams 7 and 8 whose upper ends 9 and 10 respectively are bent over vertically so as to extend parallel to one another, said upper ends 9 and 10 being formed with horizontally aligned holes 11. The lowermost ends 12 and 13 respectively of the two strip-shaped beams 7 and 8 are also bent over so as to extend substantially vertically parallel to one another, said ends 12 and 13 being rigidly interconnected by a profiled rod 14 whose opposite ends project beyond the beam portions 12 and 13 to form horizontally aligned pins 26 and 27 intended for pivotal connection to the free ends of the lower lifting links of a three-point lifting device or hitch carried by an agricultural tractor or other operating vehicle. It will be realised that the holes 11 in the upper end portions 9 and 10 of the beams 7 and 8 serve to receive a substantially horizontal pivot pin to connect the frame 1 to the free end of the adjustable upper lifting link of a three-point lifting device or hitch of the kind which has just been mentioned. A horizontal frame beam 15 is rigidly secured to the upper extremities of the two upper end portions 9 and 10 of the beams 7 and 8 and it will be seen from FIG. 2 of the drawings that said beam 15 projects equal distances from the opposite sides of the upper ends 9 and 10 and has a total length 16 (laterally of the implement) which is substantially seven tenths of the overall distance 17 between the lowermost ends 12 and 13 of the beams 7 and 8.

The substantially horizontal frame portion 6 is formed principally from strip-shaped members and its leading end is rigidly secured to the lowermost ends 12 and 13 of the beams 7 and 8. Two integral strip-shaped members of the substantially horizontal portion 6 converge rearwardly from the substantially vertical portion 5 in a direction opposite to the intended direction of operative travel 28 (FIG. 1) of the implement and a supporting plate 18 (FIGS. 1, 2 and 4 of the drawings) extends between the two integral strip-shaped members of the frame portion 6 that have just been mentioned. The supporting plate 18 carries an anchorage 19 to which the gear box or housing 4 is rigidly secured by bolts 30. The anchorage 19 is preferably, but not essentially, integral with the supporting plate 18 as shown in the accompanying drawings.

A supporting member 20 is rigidly secured to the two beams 7 and 8 of the substantially vertical frame portion 5 and has a vertical portion 21 located at the rear of the beams 7 and 8 with respect to the direction 28 from the lower edge of which a horizontal rim 22 projects forwardly in the direction 28 between the two beams 7 and 8. A support for the lower region of the hopper 2 is afforded by an upper portion 23 of the supporting member 20 which upper portion is inclined upwardly and rearwardly with respect to the direction 28 from the upper edge of the vertical portion 21. It is preferred, but is not essential, that the vertical portion 21, the horizontal rim 22 and the inclined upper portion 23 of the supporting member 20 should all be formed integrally as parts of a single plate. In order to increase the rigidity of the frame 1, the vertical and horizontal portions 5 and 6 thereof are rigidly interconnected by inclined struts 24 and 25 (FIGS. 1 and 2).

The gear box or housing 4 is formed as a cast unit from, for example, cast iron and, as previously mentioned, the bolts 30 are employed to secure it rigidly to the anchorage 19. In addition to the substantially vertical output shaft 31, the housing 4 is provided with a substantially horizontal input shaft 32 that projects forwardly therefrom in the direction 28. The shafts 31 and 32 are rotatably journalled in spaced pairs of ball bearings 33, 34 and 35, 36 respectively, all four of the ball bearings 34 to 36 being of the same size. The longitudinal axes of the two shafts 31 and 32 are inclined to one another at an angle 37 (FIG. 3) of 90° but it is emphasised that the angle 37 could have any required magnitude up to 180°, it being preferred, however, to employ an angle of less than 180°. The inner ends of the two shafts 31 and 32 carry corresponding bevel pinions 38 and 39 whose teeth are in mesh with one another. The pinions 38 and 39 are secured to the corresponding shafts 31 and 32 with the aid of corresponding keys 40 and 41 and corresponding retaining rings 42 and 43 whose inner edges are received in grooves formed very close to the inner ends of the shafts 31 and 32.

At the side of the gear box or housing 4 opposite to the angle 37 that is enclosed between the two shafts 31 and 32, said gear box or housing is formed with an access opening 44 whose size and shape are such that the bevel pinions 38 and 39 can be mounted on, and removed from, the inner ends of the shafts 31 and 32 through said opening. The access opening 44 is provided with a closing member in the form of a synthetic plastics cap 45 which is retained frictionally in the opening but which could, if required, be positively retained in position with the aid of a clip, clamp, strap or the like. The bevel pinions 38 and 39 are similar to one another and each of them has a maximum diameter 46 that is greater than the maximum diameter 47 of the bores which receive the four ball bearings 33 to 36 inclusive. The portion of the input shaft 32 that projects forwardly from the gear box or housing 4 with respect to the direction 28 is keyed (as illustrated) or splined to enable it to be placed in driven connection with the power take-off shaft of an operating tractor or other vehicle by way of an intermediate telescopic transmission shaft (not shown) of known construction having universal joints at its opposite ends.

That portion of the output shaft 31 which projects upwardly above the gear box or housing 4 is provided with the rotary spreading member 3, said spreading member 3 comprising a square or other angular plate 51 whose outermost edge is formed with a downwardly bent-over rim 52. A central region of the plate 51 is elevated as compared with a radially outer region thereof, said central region comprising a substantially horizontal flat portion 54 and a surrounding upwardly inclined portion 53. The flat portion 54 has a central hole formed with a downwardly bent-over collar 55 which surrounds the shaft 31 and which is welded or otherwise rigidly secured to that shaft. The outer region of the upper surface of the plate 51 is provided with a number of spreading blades 56 that is equal to the number of angular corners exhibited by the plate 51. The blades 56 are in register with the angular corners of the plate 51 and the construction which is being described has four blades 56 since the plate 51 is a substantially square one. The shaft 31 extends upwardly above the spreading member 3 through an opening 57 in the bottom 67 of the hopper 2 into the interior of that hopper where its upper end is provided with an agitator 58 that will be further described below.

The hopper 2 has a lower portion 62 which, as previously mentioned, is of inverted frusto-conical configuration but also has an upper portion 61 of right circular cylindrical configuration that is releasably secured to the lower portion 62. The lower portion 62 is secured to the frame 1 while the upper portion 61 is releasably secured to the lower portion 62 by means of eight relatively spaced bolts 64 that are entered through registering holes in an inwardly bent-over conical rim 63 (FIG. 5) at the foot of the upper hopper portion 61 and in the similarly inclined wall of the lower portion 62. The upper edge of the ower hopper portion 62 is bent over so as to form a horizontal rim 65 to increase the rigidity of the mouth of the hopper portion 62. The upper edge of the upper hopper portion 61 is bent over inwardly to form a conically inclined rim 66. The bottom 67 of the lower hopper portion 62 is integral with the conically inclined upright wall and horizontal rim 65 and its central opening 57 has a diameter 68 that is greater than the diameter of the shaft 31 that is entered therethrough. It is preferred that the diameter 68 should be at least 1.25 times the diameter of the shaft 31 and, in the embodiment which is being described, the diameter 68 is substantially twice the diameter of the shaft 31. The opening 57 has an upwardly bent-over rim 69 which is integral with the hopper bottom 67.

The upper hopper portion 61 has a height 70 which is equal to substantially three quarters of the height 71 of the lower hopper portion 62. At a distance 72 below the horizontal rim 65 of the lower hopper portion 62, two supports 74 and 75 are welded or otherwise rigidly secured to the outer surface of the hopper portion 62 at the front thereof with respect to the direction 28. The two supports 74 and 75 are horizontally spaced apart from one another by a distance that is substantially equal to the total lateral length 16 of the horizontal frame beam 15. Bolts 76 are employed to secure the supports 74 and 75 to opposite end regions of the beam 15 and a further central bolt 76 directly interconnects the beam 15 and the wall of the lower hopper portion 62. The distance 72 is substantially one quarter of the height 71 of the lower hopper portion 62. An inclined fastening support 78 is welded or otherwise rigidly secured to the external surface of the inclined wall of the lower hopper portion 62 at a vertical distance 77 above the hopper bottom 67 which is equal to substantially one eighth of the height 71 of the lower hopper portion 62. Bolts 79 are employed to secure the fastening support 78 rigidly, but releasably, to the upper portion 23 of the supporting member 20 of the frame. The lower hopper portion 62 is thus supported by the frame 1 at a location close to its lower end while the supports 74 and 75 serve a similar function towards the top of the lower hopper portion 62, said supports 74 and 75 being spaced apart from one another horizontally in a direction perpendicular to the direction 28. This arrangement provides a satisfactory support for the hopper 2 by the frame 1 so that said hopper can be of a simple construction and can readily be mounted on the frame 1 without complication. The frame 1 itself is of simple construction but nevertheless provides an adequate rigid support for the hopper 2. The gear box or housing 4 and the rotary spreading member 3 are connected to the frame 1 independently of the hopper 2 since the rotary output shaft 31 is merely entered through the opening 57 in the hopper bottom 67 which opening is of sufficient diameter to ensure adequate clearance. This arrangement considerably simplifies the assembly of the whole implement and allows the gear box or housing 4 and rotary spreading member 3 to be manufactured as a single unit for independent connection to the frame 1.

The aforementioned agitator 58 (FIG. 3) has a horizontally disposed blade 85 at its lower end which blade includes a rim 86 that projects downwardly from the lower side of the blade. The rim 86 surrounds the upstanding rim 69 of the opening 57 and thus, in effect, forms a labyrinth seal with said rim 69. The shaft 31 is provided close to its uppermost end with a short transverse pin 87 that connects said shaft 31 to the rim 86 beneath the blade 85, the general arrangement being that of a quick-release bayonet joint. A stiffening plate 88 is provided on top of the blade 85 and a detachable portion 90 of the agitator 58 is releasably secured to the plate 88 by vertical bolts 89. The detachable portion 90 comprises a central upright arm 91 provided with a plurality of relatively spaced laterally projecting arms 92. An agitating ring 93 is mounted at the upper end of the arm 91. The lowermost end of the arm 91 carries a bracket which is turnably connected by pins 94 to a ring which ring is itself turnably connected by pins 95 to the limbs of a bracket 96 the base of which is releasably fastened to the plate 88 by the bolts 89.

The two axes afforded by the pins 94 and 95 are relatively perpendicular and intersect one another so that the detachable portion 90 of the agitator is, in effect, connected to the blade 85 by way of a universal joint.

During the assembly of the implement, the gear box or housing 4 and the rotary spreading member 3 are fastened to the frame by the bolts 30 while the hopper 2 is separately fastened thereto in the manner which has been described with the aid of the supports 74, 75 and 78. The agitator 58 is subsequently mounted in position with the aid of the quickly releasable bayonet joint which has been described but, if the particular material that is to be spread is one which does not require much agitation, the bolts 89 can be undone to enable the portion 90 of the agitator to be temporarily removed from the hopper 2 leaving substantially only the blade 85. The bottom 67 of the hopper 2 has an outlet port 100 which, as can be seen in FIG. 4 of the drawings, subtends an angle of substantially 180° around the axis of rotation 101 (FIG. 3) of the spreading member 3. A supporting ring 102 is welded to the lower surface of the hopper bottom 67 so as to extend concentrically around the axis of rotation 101 and two substantially annular closing plates 103 and 104 are arranged turnably around the ring 102 in superposed relationship beneath the hopper bottom 67. A spring circlip 105 entered in a groove in the external surface of the ring 102 maintains the plates 103 and 104 in their appointed position. The two closing plates 103 and 104 are formed with corresponding outlet openings 106 and 107 and it will be apparent from FIGS. 3 and 4 of the drawings that the openings 106 and 107 can be caused to overlap to a chosen extent and to occupy a chosen angular setting around the axis 101 relative to the outlet port 100. The degree of overlap governs the amount of material per unit time which can pass through the port 100 and openings 106 and 107 to reach the spreading member 3 and the angular setting of the actual aperture around the axis 101 is a principal factor in determining the direction in which the material from the hopper 2 is ejected from the implement relative to the direction 28. It will be noted that the port 100 and openings 106 and 107 are in vertical alignment with the inclined portion 53 of the spreading member plate 51 so that material which falls onto said portion 53 is caused to move towards the spreading blades 56 by its inclination as well as by the rapid rotation of the plate 51 around the axis 101.

The closing plates 103 and 104 are connected by coupling rods 109 and 108 respectively with an arm 110 forming part of an adjusting member that is generally indicated by the reference 111. The adjusting member 111 extends generally vertically and is turnably mounted in the frame beam 15 and in a lug 99 that projects laterally from the strip-shaped beam 7. An upper portion of the adjusting member 111 takes the form of a substantially horizontal control arm 112 that may be integral with the vertically extending portion of the adjusting member. The control arm 112 is movable along a segment-shaped guide 113 that is marked with a scale (FIG. 4) and which is formed with an arcuate slot along which a stop 114 can be moved to any chosen position. The stop 114 incorporates a wing nut which can be tightened to retain it at any chosen setting along the slot. THe control arm 112 can be moved over the guide 113 from a position in which the outlet openings 106 and 107 do not overlap at all to a position in which a maximum degree of overlap is obtained. The stop 114 can be retained in a setting corresponding to the rate of flow of material per unit time to the spreading member 3 which is required for any particular spreading operation. The plates 103 and 104 are held frictionally in their appointed positions beneath the hopper bottom 67.

In the use of the implement which has been described, it is connected to the three-point lifting device or hitch of an agricultural tractor or other operating vehicle with the aid of the apertured upper ends 9 and 10 of the beams 7 and 8 and the horizontally aligned pins 26 and 27. The rotary input shaft 32 is placed in driven connection with the power take-off shaft of the same tractor or other operating vehicle in the manner previously described so that the spreading member 3 and the agitator 58 can be rotated by way of the bevel pinions 38 and 39 within the gear box or housing 4. The gear box or housing 4 may be quite small compared with the overall size of the implement since the pinions 38 and 39 can be mounted on, and withdrawn from, their shafts 31 and 32 by way of the access opening 44. The diameters of the parts 115 and 116 (FIGS. 1 to 3) of the gear box or housing 4 which receive the ball bearings 33, 34 and 35, 36 respectively may consequently also be quite small. This described construction of the gear box or housing 4 enables the shafts 31 and 32 and the pinions 38 and 39 to be assembled and disassembled quickly and easily. When the hopper 2 is completely filled, the inclined stiffening rim 66 of its upper portion 61 tends to prevent spillage of material over the upper edge of the hopper and also tends to prevent materal of light density from being blown out of the hopper by strong winds. Alteration in the direction in which material is ejected from the implement with respect to the direction 28 can be effected by changing the points at which the coupling rods 108 and 109 are connected to the closing plates 104 and 103 respectively.

The portion of the hopper 2 can be released from the portion 62 by disconnecting the bolts 64. The dimensions of the portion 61 are chosen relative to the dimensions of the portion 62 and the dimensions of the frame 1 in such a way that the portion 61 can be arranged around a part of the lower portion 62 and the frame 1 as is shown in dotted lines in FIG. 1. Herefore the adjusting member 111 and the guide 113 can be dismounted from the frame and arranged e.g. in the hopper portion 62. In this way the implement can be stored or transported easier.

Although certain features of the spreading implement which has been described and/or illustrated in the accompanying drawings will be set forth in the following claims as inventive features, it is emphasised that the invention is not necessarily limited to those features and that it encompasses within its scope all of the parts of the implement that have been described and/or illustrated both individually and in various combinations.

Having thus described my invention, what I claim as new and desire to secure by letters patent of the United States is:

1. A spreading implement comprising a frame, a container on said frame and a rotatable spreader supported below said container, said frame having coupling means for attaching the implement to the lifting hitch at the rear of a prime mover and transmission means for drivenly connecting a take off from said prime mover to said spreader to rotate same, said transmission means including a gear box with an input shaft connectable to the take off and an output shaft connected to said spreader, said shafts being mounted in said gear box to extend therefrom at angles to one another and retained in driving connection with one Another, said connection comprising toothed pinions in mesh with one another and said shafts being rotatably journalled in ball bearings in said housing which bearings have diameters that are less than the maximum diameters of said pinions, said shafts extending from said box to enclose an angle less than 180° between them and said gear box being a single unit housing with only one access opening to the connection between said shafts, adjacent the meshed pinions and substantially opposite that side of the housing from which said shafts extend, said opening having a removable closing member whereby said pinions and shafts can be quickly and readily withdrawn through said opening.

2. An implement as claimed in claim 1, wherein said housing is made of cast iron.

3. An implement as claimed in claim 1, wherein said closing member is a cap that is retained in said access opening frictionally.

4. A spreading implement comprising a frame, a container on said frame and a rotatable spreader supported below said container, said frame having coupling means for attaching the implement to the lifting hitch at the rear of a prime mover and transmission means for drivenly connecting a take off from said prime mover to said spreader to rotate same, said transmission means including a gear box with an input shaft connectable to the take off and an output shaft connected to said spreader, said shafts being retained in driving connection with one another by meshed toothed pinions, the longitudinal axes of said shafts enclosing an angle substantially 90° between them and said shafts being rotatably journalled in bearings releasably secured in said housing, said bearings having diameters less than the maximum diameters of the pinions, said gear box being a single unit housing with an access opening to the connection between said shafts adjacent the meshed pinions and substantially opposite that side of said housing from which said shafts extend, said opening facing said pinions and having a removable closing member whereby said shafts and pinions can be quickly and readily withdrawn through said opening.

5. An implement as claimed in claim 4, wherein each pinion is detachably secured to one of said shafts with a corresponding key and retaining ring for ready disconnection.

6. A spreading implement comprising a frame, a container with outlet means on said frame and a rotatable spreader supported below said container, said frame having coupling means for attaching the implement to the lifting hitch at the rear of a prime mover and transmission means for drivenly connecting a take off from said prime mover to said spreader to rotate same, said transmission means including a gear box with an input shaft connectable to the take off and an output shaft connected to said spreader, said spreader comprising a horizontally extending spreading member welded to said output shaft and said spreading member having an inclined portion located below said outlet means, said shafts being mounted in driving connection in said gear box to extend therefrom at an angle less than 180° between them, said gear box being a single unit housing with an access opening to the driving connection between said shafts and substantially opposite that side of the housing from which said shafts extend, said opening facing the driving connection of said shafts and having a removable closing member, said shafts being rotatably journalled in bearings in said housing which bearings have diameters that are less than the maximum diameters of the driving connection between said shafts whereby said shafts can be moved through said opening to expose said bearings.

7. An implement as claimed in claim 6, wherein said output shaft extends through a bottom opening in said container and an agitator is detachably connected to the upper end of said output shaft which extends inside the container.

8. An implement as claimed in claim 7, wherein said bottom opening is substantially greater in diameter than the diameter of said shaft.

9. A spreading implement comprising a frame, a container on said frame and a rotatable spreader supported below said container, said frame having coupling means for attaching the implement to the lifting hitch at the rear of a prime mover and transmission means for drivenly connecting a take off from said prime mover to said spreader to rotate same, said transmission means including a gear box with an input shaft connectable to the take off and an output shaft connected to said spreader, said shafts being mounted in said gear box to extend therefrom at angles to one another and retained in driving connection with one another, said output sahft extending through a bottom opening in said container and an agitator detachably etachably connected to the upper end of said output shaft inside said container, said agitator including a blade positioned adjacent the container bottom, and an upper detachable portion of said agitator being releasably connected to said blade to extend upwardly into the interior of said container, said gear box having an access opening to the connection between said shafts whereby said agitator can be detached and said shafts moved towards said opening.

10. An implement as claimed in claim 9, wherein said detachable portion comprises a central arm provided with laterally projecting arms, the central arm being pivotally connected to a coupling member that is releasably secured to said blade.

11. An implement as claimed in claim 10, wherein said agitator is connected to said output shaft by a quickly releasable bayonet coupling.

12. A spreading implement comprising a frame, a container on said frame and a rotatable spreader supported below said container, said frame having coupling means for attaching the implement to the lifting hitch at the rear of a prime mover and transmission means for drivenly connecting a take off from said prime mover to said spreader to rotate same, said transmission means including a gear box with an input shaft connectable to the take off and an output shaft connected to said spreader, said output shaft extending through an enlarged bottom opening in said container and said opening being surrounded by an upturned rim of the container bottom, an agitator being detachably connected to the upper end of said output shaft which extends inside the container and adjacent said upturned rim, the bottom of said container and a major portion of the side walls thereof being formed integrally with one another, said shafts being mounted in said gear box to extend therefrom at angles to one another and retained in driving connection with one another, said shafts extending from said housing to enclose an angle less than 180° between them and the gear box being a single unit housing with an access opening whereby said output shaft can be withdrawn through said enlarged opening upon disconnection of the agitator.

13. An implement as claimed in claim 12, wherein the bottom of said container has at least one outlet port which can be opened and closed to a chosen extent by at least one closing plate, said plate being retained in its operative position by a suspension ring secured to the container bottom to encircle said enlarged opening.

14. An implement as claimed in claim 13, wherein said suspension ring is rigidly secured to the container bottom and said closing plate is positioned between said bottom and a circlip mounted on said suspension ring.

15. A spreading implement comprising a frame, a container on said frame and a rotatable spreader supported below said container, said frame having coupling means for attaching the implement to the lifting hitch at the rear of a prime mover and transmission means for drivenly connecting a take off from said prime mover to said spreader to rotate same, said transmission means including a gear box with a generally horizontal input shaft connectable to the take off and an upright output shaft connected to said spreader, said shafts being mounted in said gear box to extend therefrom at angles to one another and retained in driving connection with one another, said shafts extending from said housing to enclose an angle less than 180° between them and said gear box being a single unit housing with an access opening to the connection between said shafts and substantially opposite said side of the housing from which said shafts extend, the mouth of said opening being contained in a plane midway between the axes of said shafts and having a removable closing member, said housing being mounted on a substantially horizontal portion of said frame, said portion comprising converging members that converge rearwardly with respect to the direction of travel, a supporting plate extending between said converging members and said housing being supported with its lower side on said plate, whereby said plate is mounted in front of said access opening relative to the intended direction of travel of the device.

16. An implement as claimed in claim 15, wherein said container is secured to a fastening support adjacent its bottom, said fastening support being rigidly connected to said frame.

17. An implement as claimed in claim 16, wherein said container is also secured to two further fastening supports located above said first-mentioned fastening support, said two further fastening supports being horizontally spaced apart from one another and being rigidly connected to a substantially horizontal beam of said frame.

18. An implement as claimed in claim 17, wherein said substantially horizontal beam of the frame is located at the top of a substantially vertical portion of said frame and said vertical frame portion being two upwardly convergent beams which carry a supporting member of said frame adapted to cooperate with the lower and first mentioned fastening support.

19. A spreading implement comprising a frame, a container on said frame and a rotatable spreader supported below said container, said frame having coupling means for attaching the implement to the lifting hitch at the rear of a prime mover and transmission means for drivenly connecting a take off from said prime mover to said spreader to rotate same, said transmission means including a gear box with an input shaft and an output shaft extending from said gear box, said container having a bottom with an outlet port and an enlarged opening for receiving the upper end of said output shaft in spaced relationship, and said opening being surrounded by an upturned rim of the container bottom, said spreader being connected to the output shaft and an agitator detachably connected to the upper end of said shaft and having a downwardly extending rim encircling the upturned rim and covering said opening, plates being secured to the bottom of said container and a ring underlying said plates with spring means bearing on same to secure said container and its port in fixed position with respect to the output shaft and the spreader.

20. An implement as claimed in claim 19, wherein said container is a hopper having an upper substantially cylindrical portion and a lower portion of substantially inverted frustoconical configuration, said upper portion being detachably connected to said lower portion and the latter being secured to said top beam.

21. An implement as claimed in claim 20, wherein the two portions of said hopper are separable and said upper portion being positionable to surround said lower portion during transport and/or storage.

* * * * *

UNITED STATES PATENT OFFICE
CERTIFICATE OF CORRECTION

Patent No. 3,767,126           Dated October 23, 1973

Inventor(s) Cornelis Van Der Lely

It is certified that error appears in the above-identified patent and that said Letters Patent are hereby corrected as shown below:

Col. 7, line 18, delete "and shafts"

Col. 7, line 46, delete "shafts and"

Col. 8, line 21, delete "shafts" and insert

-- driving connection --.

Col. 8, line 41, change "shafts" to -- output shaft --;

line 42, change "towards" to -- out of --;

line 42, before "opening" insert -- bottom --.

Col. 10, line 36, delete "spring";

lines 37 and 38 delete "container and its port"

and insert -- plates --;

line 38, change "position" to -- positions --.

Signed and sealed this 18th day of June 1974.

(SEAL)
Attest:

EDWARD M. FLETCHER, JR.           C. MARSHALL DANN
Attesting Officer                 Commissioner of Patents